(12) United States Patent
Sakamoto et al.

(10) Patent No.: US 11,876,380 B2
(45) Date of Patent: Jan. 16, 2024

(54) HYBRID POWER GENERATION SYSTEM AND CONTROL METHOD OF HYBRID POWER GENERATION SYSTEM

(71) Applicant: MITSUBISHI HEAVY INDUSTRIES ENGINE & TURBOCHARGER, LTD., Sagamihara (JP)

(72) Inventors: Kohei Sakamoto, Sagamihara (JP); Yoshimi Okazaki, Sagamihara (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 358 days.

(21) Appl. No.: 17/282,625

(22) PCT Filed: Aug. 26, 2019

(86) PCT No.: PCT/JP2019/033261
§ 371 (c)(1),
(2) Date: Apr. 2, 2021

(87) PCT Pub. No.: WO2020/075400
PCT Pub. Date: Apr. 16, 2020

(65) Prior Publication Data
US 2021/0344203 A1  Nov. 4, 2021

(30) Foreign Application Priority Data
Oct. 9, 2018 (JP) .................. 2018-190801

(51) Int. Cl.
*H02J 3/46* (2006.01)
*G05B 6/02* (2006.01)
(Continued)

(52) U.S. Cl.
CPC .................. *H02J 3/46* (2013.01); *G05B 6/02* (2013.01); *H02J 3/32* (2013.01); *H02P 9/02* (2013.01);
(Continued)

(58) Field of Classification Search
CPC .. H02J 3/46; H02J 3/32; H02J 2300/24; H02J 2300/28; H02J 3/381; G05B 6/02;
(Continued)

(56) References Cited

U.S. PATENT DOCUMENTS 8,823,193 B1 *  9/2014  Yazghi ...................... H02P 9/00
                                                     290/44
2013/0144450 A1 *  6/2013  Yasugi ................... F03D 9/255
                                                     700/287
(Continued)

FOREIGN PATENT DOCUMENTS

JP         4-372528 A     12/1992
JP       2009174329 A *   8/2009
(Continued)

Primary Examiner — Mohammad Ali
Assistant Examiner — Dhruvkumar Patel
(74) Attorney, Agent, or Firm — BIRCH, STEWART, KOLASCH & BIRCH, LLP (57) ABSTRACT

The hybrid power generation system includes a renewable energy power generation device and a rotary power generation device connected to a common alternating-current power system. In the system, if renewable energy or an output fluctuates, a correction value calculated based on the fluctuation amount is added to a control parameter as a feedforward component, controlling the rotary power generation device.

9 Claims, 5 Drawing Sheets

(51) Int. Cl.
 *H02J 3/32* (2006.01)
 *H02P 9/02* (2006.01)
(52) U.S. Cl.
 CPC ....... *H02J 2300/24* (2020.01); *H02J 2300/28* (2020.01)
(58) Field of Classification Search
 CPC .......... H02P 9/02; H02P 2101/25; H02P 9/04; H02P 9/102; H02P 9/105; Y02E 10/56
 See application file for complete search history.

(56) References Cited

U.S. PATENT DOCUMENTS

| | | | |
|---|---|---|---|
| 2017/0003700 A1* | 1/2017 | Pavlovski | H02J 3/003 |
| 2018/0041151 A1* | 2/2018 | Turpin | H02P 9/04 |
| 2018/0128165 A1* | 5/2018 | Hino | H02J 3/381 |

FOREIGN PATENT DOCUMENTS

| | | |
|---|---|---|
| JP | 2011-67078 A | 3/2011 |
| JP | 5508798 B2 | 6/2014 |

* cited by examiner

HYBRID POWER GENERATION SYSTEM AND CONTROL METHOD OF HYBRID POWER GENERATION SYSTEM

TECHNICAL FIELD

The present disclosure relates to a hybrid power generation system which includes a renewable energy power generation device and a rotary power generation device connected to a common alternating-current power system, and a control method of the hybrid power generation system.

BACKGROUND

In recent years, a power generation system is widespread which includes a renewable energy power generation device for generating power by using renewable energy such as solar energy or wind energy as a clean energy source considering an environmental load. A power generation amount of the renewable energy power generation device depends on a supply amount of the renewable energy, influencing the device to no small extent by external factors such as weather conditions. Thus, in the renewable energy power generation device, ensuring stability of the power generation amount is an issue.

In order to stabilize the power generation amount in the renewable energy power generation device, for example, a so-called hybrid power generation system is known which is configured to connect a rotary power generation device capable of driving by a power source such as an engine to a power system in common with the renewable energy power generation device (Patent Document 1). In this type of hybrid power generation system, the power generation amount is stabilized by covering, with the rotary power generation device, a fluctuation amount of a case in which the renewable energy fluctuates due to the weather conditions.

CITATION LIST

Patent Literature

Patent Document 1: JPH4-372528A

SUMMARY

Technical Problem

In the above-described hybrid power generation system, the power generation amount is stabilized by performing drive control on the rotary power generation device in accordance with the fluctuation amount of the renewable energy. However, if the fluctuation amount of the renewable energy exceeds a predetermined amount, a rotation speed of the rotary power generation device is temporarily decreased by a load fluctuation, decreasing an output frequency. Such a phenomenon appears in a case in which, for example, if a solar panel is used as the renewable energy power generation device, the amount of solar radiation on the solar panel is rapidly decreased when the weather changes from sunny to cloudy. Since the decrease in output frequency has a negative effect on the power system to which power is supplied, the rotary power generation device needs to be disconnected from the power system, resultantly making stabilization of the power generation amount impossible.

In order to avoid such disconnection of the rotary power generation device, a hybrid power generation system which further includes an electric storage device connectable to the power system is known. In the above system, a power generation amount of the system is stabilized by connecting the electric storage device to the power system in place of the rotary power generation device, if the rotary power generation device may be disconnected when the fluctuation amount of the renewable energy exceeds the predetermined value. The electric storage device adopts a lithium ion storage battery or the like in which power is stored in advance. However, in large-scale power generation system where infrastructure power is supplied, the electric storage device is required of a large capacity, making the electric storage device extremely expensive.

At least one embodiment of the present invention is made in view of the above, and an object of the present invention is to provide a hybrid power generation system capable of inexpensively implementing output stabilization when the renewable energy fluctuates and a control method of the hybrid power generation system.

Solution to Problem (1) In order to solve the above-described problems, a hybrid power generation system according to at least one embodiment of the present invention is a hybrid power generation system which includes a renewable energy power generation device capable of generating power by using renewable energy, a rotary power generation device connected to an alternating-current power system in common with the renewable energy power generation device, the rotary power generation device being capable of generating power such that an output fluctuation of the renewable energy power generation device is reduced, and a control device for controlling the rotary power generation device such that a rotation speed of the rotary power generation device reaches a target rotation speed. The hybrid power generation system includes a fluctuation determination part for determining whether a fluctuation amount of the renewable energy supplied to the renewable energy power generation device or an output of the renewable energy power generation device exceeds a predetermined value, and a correction value calculation part for calculating a correction value of the control parameter based on the fluctuation amount. The control device controls the rotary power generation device based on a control parameter which is obtained by adding, as a feedforward component, the correction value calculated by the correction value calculation part, if the fluctuation determination part determines that the fluctuation amount of the renewable energy supplied to the renewable energy power generation device or the output of the renewable energy power generation device exceeds the predetermined value.

With the above configuration (1), if there is the fluctuation in the renewable energy or the output such that the rotation speed of the rotary power generation device decreases, the correction value of the control parameter of the rotary power generation device is obtained based on the amount of the fluctuation in the renewable energy or the amount of the fluctuation in the output of the renewable energy power generation device which occurs temporarily before the decrease in rotation speed of the rotary power generation device. The correction value is added to the control parameter as the feedforward component, thereby suppressing the decrease in rotation speed of the rotary power generation device. Thus devising control contents of the rotary power generation device, it is possible to inexpensively implement output stabilization when the renewable energy fluctuates.

(2) In some embodiments, in the above configuration (1), the control device performs feedback control on the control parameter based on a difference between the target rotation speed and an actually measured rotation speed of the rotary power generator.

With the above configuration (2), the correction value is added, as a feedforward component, to the control parameter used for the feedback control. Thus, it is possible to early consider the fluctuation in the renewable energy or the fluctuation in the output of the renewable energy power generation device, and to implement stabilization control with outstanding responsiveness.

(3) In some embodiments, in the above configuration (2), the control device temporarily decreases a gain when performing the feedback control on the control parameter, if the fluctuation determination part determines that the fluctuation amount of the renewable energy supplied to the renewable energy power generation device or the output of the renewable energy power generation device exceeds the predetermined value.

With the above configuration (3), the feedback control gain of the control parameter is temporarily decreased if there is the fluctuation in the renewable energy or the output such that the rotation speed of the rotary power generation device decreases, thereby emphasizing the feedforward component added to the control parameter. Thus, it is possible to suppress the decrease in rotation speed of the rotary power generation device more effectively.

(4) In some embodiments, in any one of the above configurations (1) to (3), the hybrid power generation system further includes a storage part for storing reference data defining a relationship between the fluctuation amount and the correction value for each operating state of the rotary power generation device, and an operating state acquisition part for acquiring the operating state of the rotary power generation device. The correction value calculation part calculates the correction value of the control parameter based on the fluctuation amount, based on the reference data corresponding to the operating state acquired by the operating state acquisition part.

With the above configuration (4), the reference data defined for each operating state of the rotary power generation device is used to calculate the correction value added to the control parameter. Thus, it is possible to accurately obtain the correction value added to the control parameter, in accordance with the operating state.

(5) In some embodiments, in any one of the above configurations (1) to (4), the hybrid power generation system includes an electric storage device configured to be connectable to the alternating-current power system so as to reduce the output fluctuation of the renewable energy power generation device together with the rotary power generation device.

With the above configuration (5), the hybrid power generation system further includes the electric storage device configured to be connectable to the alternating-current power system, thereby reducing the output fluctuation of the renewable energy power generation device together with the rotary power generation device, when the renewable energy fluctuates. In the present configuration, output stabilization when the renewable energy fluctuates is achieved by adding the correction value to the control parameter of the rotary power generation device as the feedforward component as described above. Thus, even in the case with the above-described electric storage device, it is possible to keep the capacity thereof low (or it is even possible to omit the electric storage device). Thus, it is possible to inexpensively implement the system with excellent stabilization.

(6) In some embodiments, in any one of the above configurations (1) to (5), the renewable energy is solar energy.

With the above configuration (6), in the hybrid power generation system using solar energy as the renewable energy, it is possible to inexpensively implement output stabilization even if solar energy fluctuates due to a change in weather.

(7) In some embodiments, in any one of the above configurations (1) to (5), the renewable energy is wind energy.

With the above configuration (7), in the hybrid power generation system using wind energy as the renewable energy, it is possible to inexpensively implement output stabilization even if wind energy fluctuates due to a change in weather.

(8) In some embodiments, in any one of the above configurations (1) to (7), the rotary power generation device includes an engine as a power source, and the control parameter the control parameter is a drive amount of an actuator for adjusting a fuel injection amount of the engine.

With the above configuration (8), since the correction value is added, as the feedforward component, to the drive amount of the actuator for adjusting the fuel injection amount of the engine serving as the power source of the rotary power generation device, it is possible to inexpensively implement stabilization of the system output.

(9) In order to solve the above-described problems, a control method of a hybrid power generation system according to at least one embodiment of the present invention is a control method of a hybrid power generation system which includes a renewable energy power generation device capable of generating power by using renewable energy, a rotary power generation device connected to an alternating-current power system in common with the renewable energy power generation device, the rotary power generation device being capable of generating power such that an output fluctuation of the renewable energy power generation device is reduced, and a control device for controlling the rotary power generation device such that a rotation speed of the rotary power generation device reaches a target rotation speed. The control method includes a fluctuation determination step of determining whether a fluctuation amount of the renewable energy supplied to the renewable energy power generation device or an output of the renewable energy power generation device exceeds a predetermined value, and a control step of controlling the rotary power generation device such that the rotation speed of the rotary power generation device reaches the target rotation speed. If the fluctuation determination part determines that the fluctuation amount of the renewable energy supplied to the renewable energy power generation device or the output of the renewable energy power generation device exceeds the predetermined value, in the control step, the rotary power generation device is controlled based on a control parameter which is obtained by adding, as a feedforward component, a correction value calculated based on the fluctuation amount.

With the above method (9), if there is the fluctuation in the renewable energy such that the rotation speed of the rotary power generation device decreases, the correction value of the control parameter of the rotary power generation device is obtained based on the amount of the fluctuation in the renewable energy or the amount of the fluctuation in the output of the renewable energy power generation device which occurs temporarily before the decrease in rotation speed of the rotary power generation device. The correction value is added to the control parameter as the feedforward component, thereby suppressing the decrease in rotation speed of the rotary power generation device. Thus devising control contents of the rotary power generation device, it is possible to inexpensively implement output stabilization when the renewable energy fluctuates.

Advantageous Effects

According to at least one embodiment of the present invention, it is possible to provide a hybrid power generation system capable of inexpensively implementing output stabilization when a renewable energy fluctuates and a control method of the hybrid power generation system.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

Figure 1:
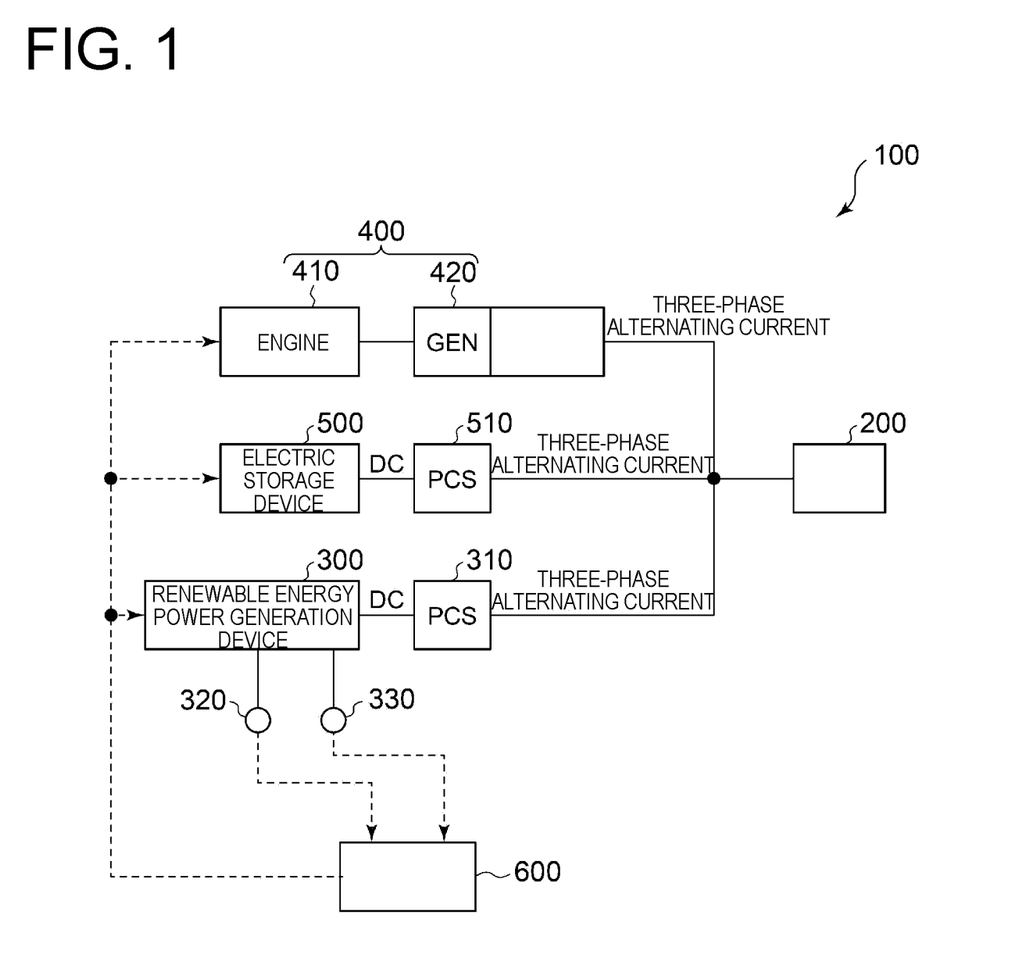
FIG. 1 is an overall configuration diagram of a hybrid power generation system according to at least one embodiment of the present invention.

FIG. 1 is an overall configuration diagram of a hybrid power generation system 100 according to at least one embodiment of the present invention. The hybrid power generation system 100 includes a renewable energy power generation device 300, a rotary power generation device 400, an electric storage device 500, and a control device 600 connected in parallel to a common alternating-current power system 200.

The alternating-current power system 200 is a power system for distributing alternating-current power to a demander (not shown). The alternating-current power distributed by the alternating-current power system 200 has a constant frequency (for example, 50 Hz or 60 Hz), and a predetermined capacity according to the demander is ensured by the hybrid power generation system 100.

The renewable energy power generation device 300 is a power generation device capable of generating power by using renewable energy. More specifically, the renewable energy power generation device 300 is, for example, a solar panel using solar energy as the renewable energy or a wind power generation device using wind power as the renewable energy, but may be power generation devices of various other forms using renewable energy. The following description is basically given, assuming the solar panel using solar energy as the renewable energy power generation device 300. However, the present invention is also applicable to power generation devices of other forms using renewable energy, unless particularly stated otherwise.

In the renewable energy power generation device 300, power is generated in accordance with a supply amount of the renewable energy. Thus, if the supply amount of the renewable energy changes due to weather conditions, a power generation amount of the renewable energy power generation device 300 also fluctuates. For example, the supply amount of solar energy is decreased when the weather changes from sunny to cloudy, and so is also the power generation amount of the renewable energy power generation device 300. Thus, the power generation amount of the renewable energy power generation device 300 depends on the supply amount of the renewable energy.

The renewable energy power generation device 300 is provided with a power conditioner 310 on an output side thereof. The power conditioner 310 is configured to include various power elements such as a DC/DC converter and an AC/DC converter, and output power from the renewable energy power generation device 300 is converted to match a specification required in the alternating-current power system 200.

The renewable energy power generation device 300 includes a renewable energy detection sensor 320 for detecting the supply amount of the renewable energy and an output detection sensor 330 for detecting an output (power generation amount) of the renewable energy power generation device 300. Only one of the renewable energy detection sensor 320 and the output detection sensor 330 may be provided.

The rotary power generation device 400 includes an engine 410 serving as a power source and a generator 420 to be driven by the engine 410. The engine 410 is an internal combustion engine capable of generating power by consuming a fossil fuel and is, for example, a diesel engine capable of outputting power by consuming a light oil fuel. An output shaft of the engine 410 is coupled to the generator 420, and the output of the engine 410 is transmitted to the generator 420, thereby generating power. The generator 420 is, for example, a rotary machine which includes a rotor where the output shaft of the engine is coupled and a stator disposed around the rotor.

Figure 2:
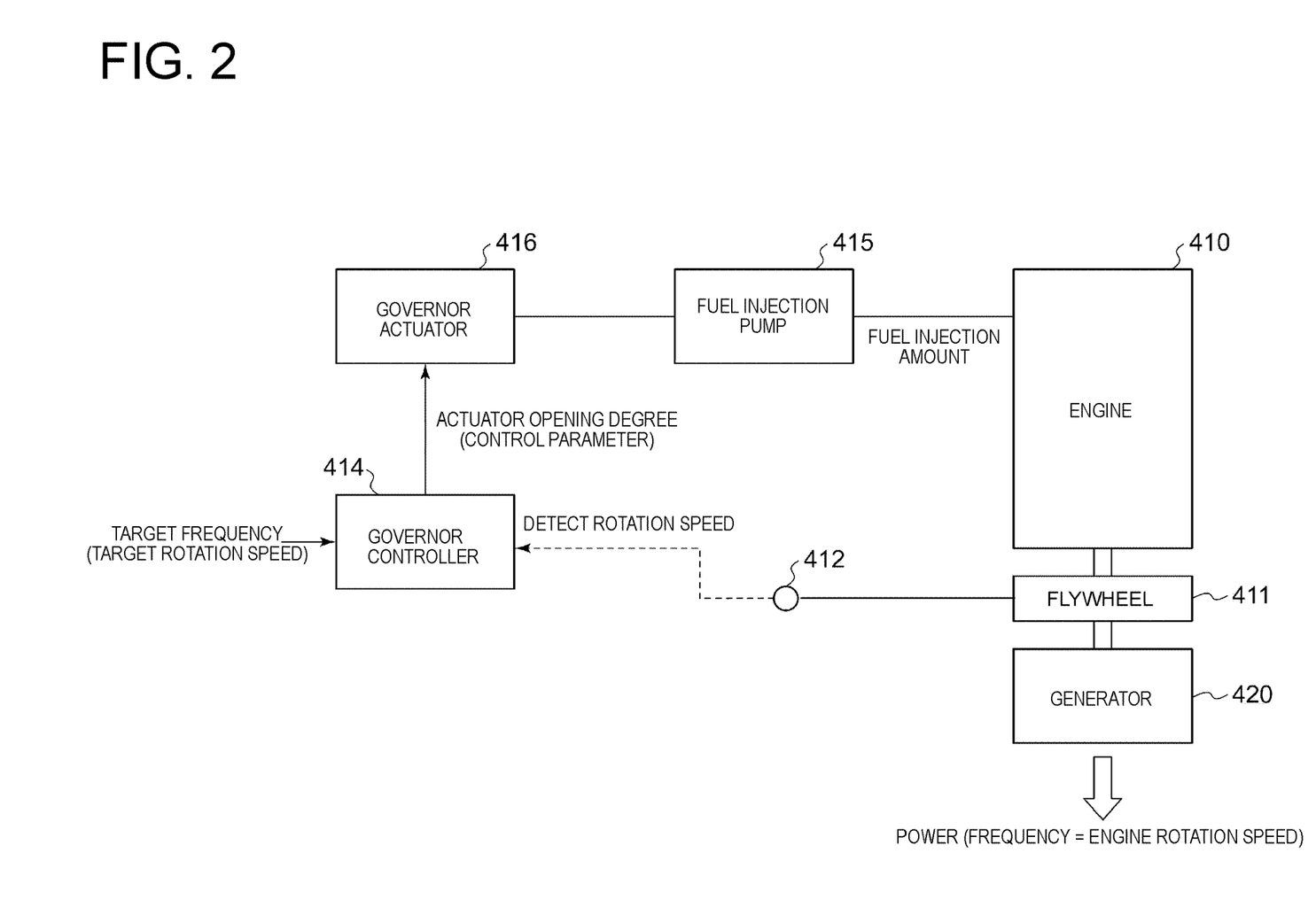
FIG. 2 is a schematic diagram showing the detailed configuration of a rotary power generation device in FIG. 1.

FIG. 2 is a schematic diagram showing the detailed configuration of the rotary power generation device 400 in FIG. 1. The engine 410 serving as the power source is connected to the generator 420 via a flywheel 411. The flywheel 411 is mounted with a rotation speed detection sensor 412, and a detection result of the rotation speed detection sensor 412 is input to a governor controller 414. The governor controller 414 controls, as a control parameter, an actuator opening degree which is a drive amount (rack amount) of a governor actuator 416 for adjusting a fuel injection amount supplied from a fuel injection pump 415 of the engine 410. The governor controller 414 adjusts the rotation speed of the engine 410 (or the generator 420) by performing feedback control on the actuator opening degree, which is the control parameter, based on a difference between a target frequency and a detection value of the rotation speed detection sensor 412, controlling the output frequency to the target frequency.

Referring back to FIG. 1, together with the aforementioned rotary power generation device 400, the electric storage device 500 stores power to be supplied to the alternating-current power system 200, when the fluctuation amount of the renewable energy exceeds the predetermined value. The electric storage device 500 adopts, for example, a lithium ion storage battery to store power of a predetermined capacity.

The electric storage device 500 is provided with a power conditioner 510 on the output side thereof. The power conditioner 510 is configured to include various power elements such as a DC/DC converter and an AC/DC converter. Direct-current power is stored in the electric storage device 500, and thus the power is converted by the power conditioner 510 to match the specification required in the alternating-current power system 200.

The control device 600 is configured as a control unit for the hybrid power generation system 100 by including hardware constituted by an electronic computation device such as a computer and installing, on the hardware, a program for performing the control method of the hybrid power generation system 100 according to at least one embodiment of the present invention. The program can be installed by reading, for example, a program stored in a predetermined storage medium with a reading device of the hardware, and the program and the storage medium storing the program also fall within the technical scope of the present invention.

Figure 3:
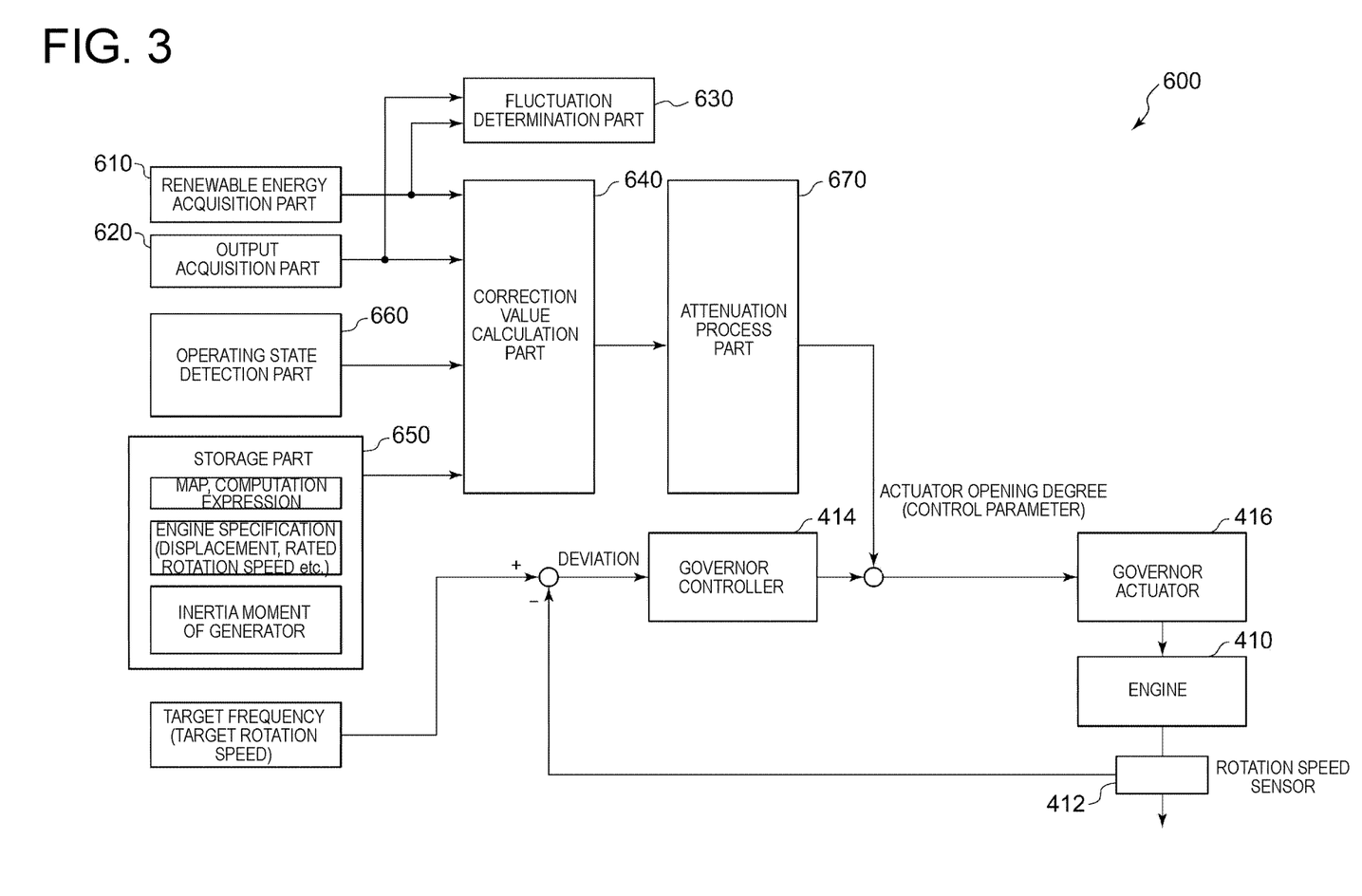
FIG. 3 is a block configuration diagram functionally showing an interior configuration of a controller in FIG. 1.

FIG. 3 is a block configuration diagram functionally showing an interior configuration of the control device 600 in FIG. 1. The control device 600 inputs, to the governor controller 414, a deviation between an input target rotation speed and an actual measured value of the rotation speed which is detected by the rotation speed detection sensor 412 disposed in the flywheel 411 of the rotary power generation device 400, thereby outputting a control signal regarding the actuator opening degree which is the control parameter in accordance with the deviation. Inputting the control signal to the governor actuator 416, the governor actuator 416 is driven, and feedback control is performed on the fuel injection pump 415 of the engine 410 (see FIG. 2). Thus, the rotation speed of the engine 410 is maintained at the target rotation speed, keeping the output frequency of the generator 420 coupled to the engine 410 constant.

The control device 600 also includes a renewable energy acquisition part 610 for acquiring the amount of the renewable energy supplied to the renewable energy power generation device 300 and an output acquisition part 620 for acquiring the output of the renewable energy power generation device 300. The renewable energy acquisition part 610 acquires the amount of the renewable energy supplied to the renewable energy power generation device 300, by acquiring a detection value of the renewable energy detection sensor 320. The output acquisition part 620 acquires the output of the renewable energy power generation device 300 by acquiring a detection value of the output detection sensor 330.

In the present embodiment, a case will be described in which the control device 600 includes both the renewable energy acquisition part 610 and the output acquisition part 620. However, the control device 600 only needs to include at least one of the renewable energy acquisition part 610 or the output acquisition part 620 as described above, in correspondence with the renewable energy detection sensor 320 or the output detection sensor 330.

The renewable energy acquired by the renewable energy acquisition part 610 or the output acquired by the output acquisition part 620 is input to a fluctuation determination part 630. The fluctuation determination part 630 monitors a temporal change in the renewable energy or the output and determines that there is a fluctuation if a change amount in a predetermined time exceeds a predetermined value.

The control device 600 includes a correction value calculation part 640 for calculating a correction value of the control parameter (actuator opening degree) based on a fluctuation amount of a case in which the fluctuation determination part 630 determines that there is the fluctuation in the renewable energy or the output. The present system is provided with a storage part 650 for storing various kinds of information (such as specifications (displacement and a rated rotation speed) of the engine 410 and an inertia moment of the generator 420 of the rotary power generation device 400) prepared in advance. The correction value calculation part 640 calculates a correction value with respect to the control parameter based on the operating state (output) of the rotary power generation device 400 detected by an operating state detection part 660, together with the information stored in the storage part 650.

The storage part 650 prestores a map or a computation expression for obtaining the correction value based on the fluctuation amount of the renewable energy acquired by the renewable energy acquisition part 610 or the output of the renewable energy power generation device 300 acquired by the output acquisition part 620 and the operating state (output) of the rotary power generation device 400. The correction value calculation part 640 appropriately reads out the map or the computation expression, thereby calculating the correction value based on the fluctuation amount of the renewable energy acquired by the renewable energy acquisition part 610 or the output of the renewable energy power generation device 300 acquired by the output acquisition part 620 and the operating state (output) of the rotary power generation device 400.

The correction value calculated by the correction value calculation part 640 is added, as a feedforward signal, to the control parameter on the feedback control loop described above. In the present embodiment, the correction value is added to the actuator opening degree which is the control parameter output from the governor controller 414. Then, the control parameter to which the correction value is added is input to the governor actuator, performing feedforward control by the correction value.

The correction value calculated by the correction value calculation part 640 is added to the control parameter via an attenuation process part 670. The attenuation process part 670 performs a process of gradually attenuating the correction value over a predetermined period after the fluctuation in the renewable energy is determined, thereby configuring such that feedforward control by the correction value is limitedly performed when the renewable energy fluctuates.

Figure 4:
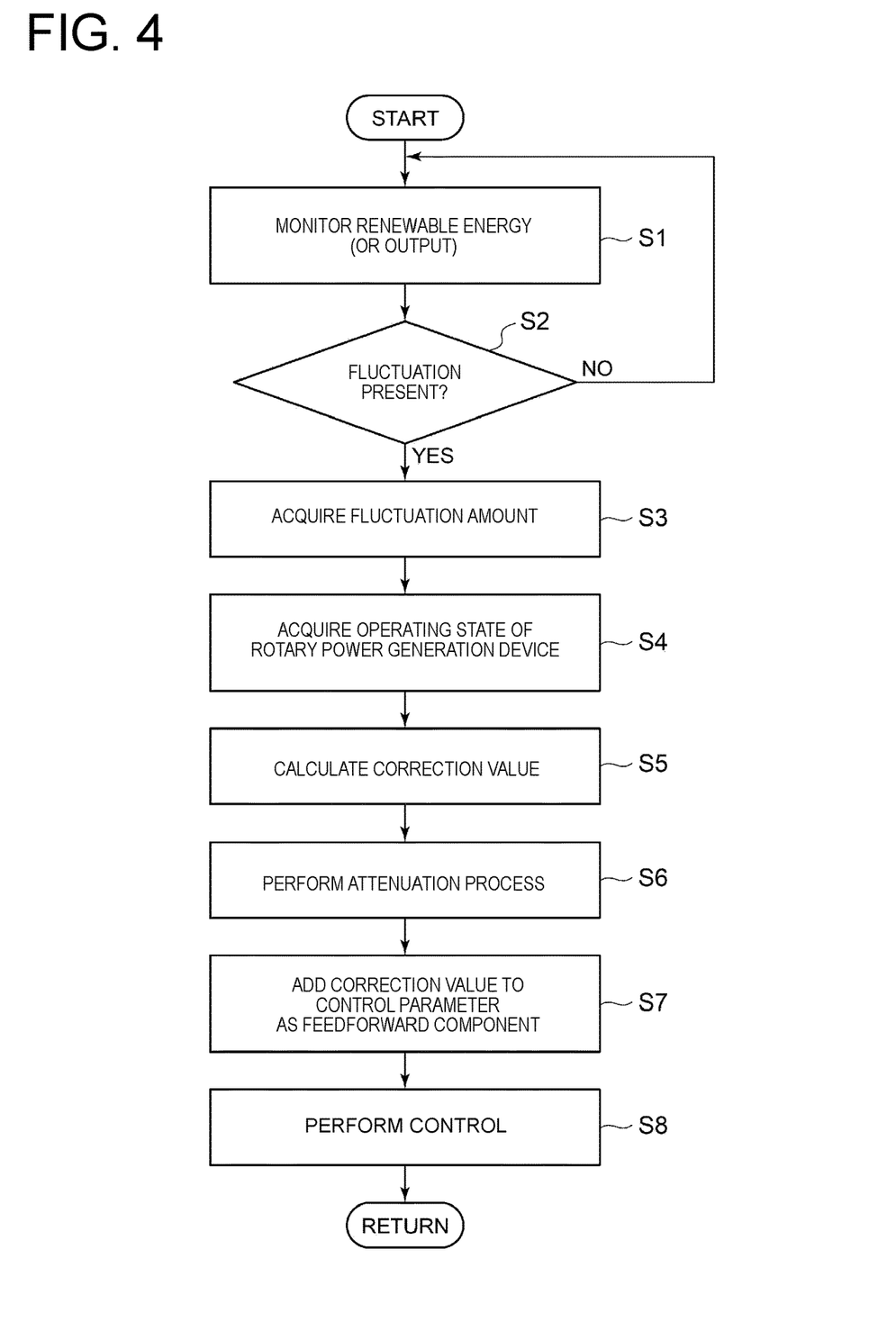
FIG. 4 is a flowchart showing steps of a control method of the hybrid power generation system according to at least one embodiment of the present invention.

Subsequently, a control method of the hybrid power generation system 100 having the above configuration will be described. FIG. 4 is a flowchart showing steps of the control method of the hybrid power generation system 100 according to at least one embodiment of the present invention.

First, the fluctuation determination part 630 monitors the amount of the renewable energy supplied to the renewable energy power generation device 300 (step S1) and determines whether there is the fluctuation in the renewable energy (step S2). The presence or absence of the fluctuation is judged based on whether the fluctuation amount in the predetermined time exceeds the predetermined value, by time-sequentially acquiring the detection value of the renewable energy detection sensor 320.

In step S2, the fluctuation determination part 630 may determine whether there is the fluctuation in the output of the renewable energy power generation device 300, by monitoring the output of the renewable energy power generation device 300. In this case, the presence or absence of the fluctuation is judged based on whether the fluctuation amount in the predetermined time exceeds the predetermined value, by time-sequentially acquiring the detection value of the output detection sensor 330.

Figure 5:
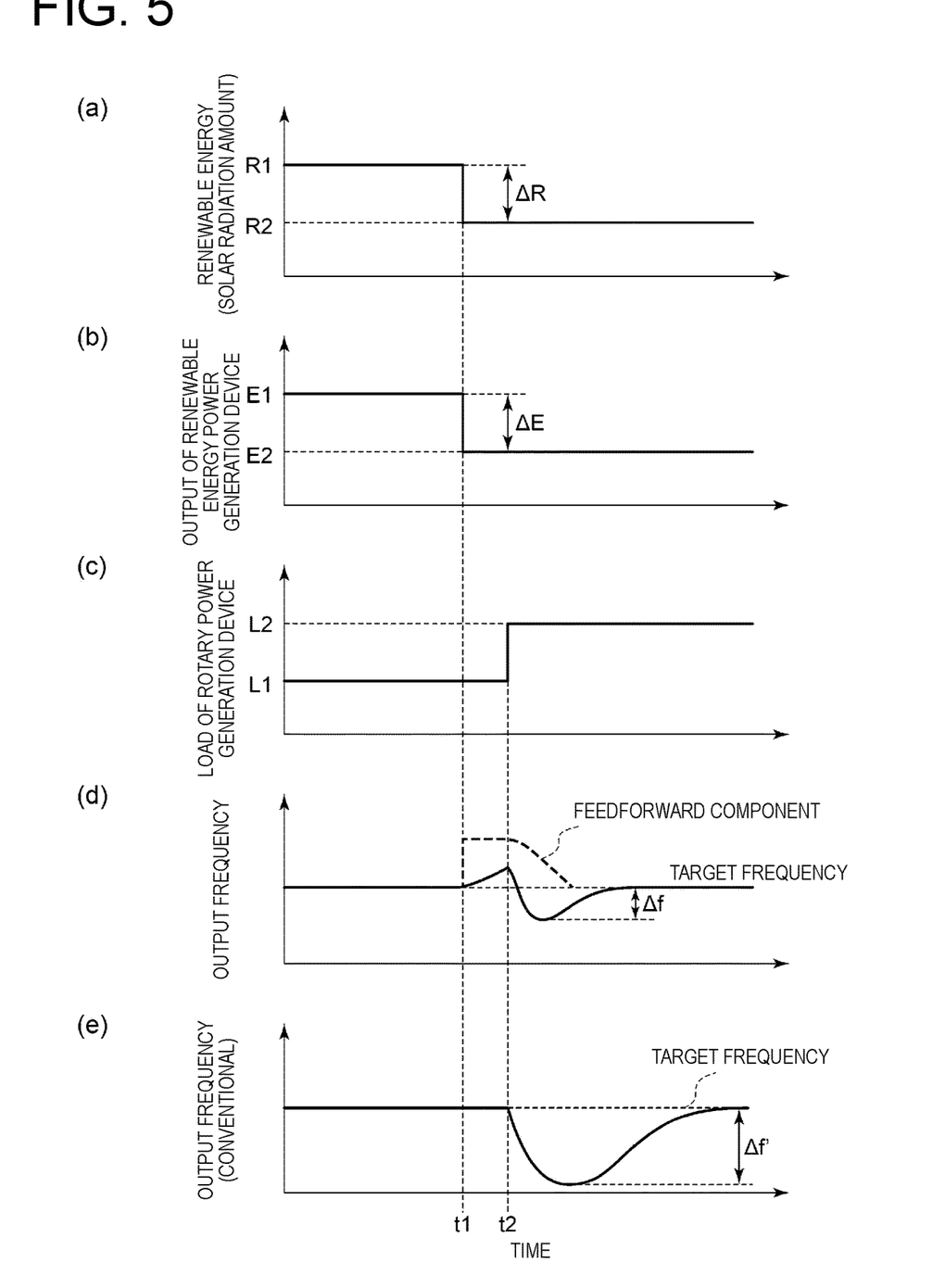
FIG. 5 shows graphs indicating temporal transitions of renewable energy, an output of a renewable energy power generation device, and an operating state (output) and an output frequency of the rotary power generation device, respectively.

If there is the fluctuation in the renewable energy (or the output of the renewable energy power generation device 300) (step S2: YES), the correction value calculation part 640 acquires the concerned fluctuation amount (step S3). (a) of FIG. 5 to be described later shows that a solar radiation amount is decreased from R1 to R2 at time t1, and a fluctuation amount thereof is ΔR. (b) of FIG. 5 shows that the output of the renewable energy power generation device 300 is decreased from E1 to E2 at the time t1, and a fluctuation amount thereof is ΔE.

Subsequently, the operating state detection part 660 acquires the operating state of the rotary power generation device 400 (step S4). The operating state is, for example, an engine output estimated from the output (power generation amount) of the rotary power generation device 400. The operating state may be acquired by observing a boost by a boost sensor.

Subsequently, the correction value calculation part 640 calculates the correction value based on the fluctuation amount ΔR (or ΔE) acquired in step S3 and the operating state acquired in step S4 (step S5). The relation of the fluctuation amount ΔR (or ΔE), the operating state, and the correction value is defined by using the map or the computation expression prestored in the storage part 650. The correction value calculation part 640 acquires the map or the computation expression from the storage part 650, and calculates the correction value corresponding to the fluctuation amount ΔR (or ΔE) acquired in step S3 and the operating state acquired in step S4.

The thus calculated correction value undergoes the attenuation process by the attenuation process part 670 (step S6) and then, as shown in FIG. 3, is added to the control parameter on the feedback control loop as the feedforward component (step S7). Then, the control device 600 performs feedback control based on the control parameter to which the feedforward component is thus added, thereby maintaining the frequency of the rotary power generation device 400 at a target frequency (step S8).

FIG. 5 shows graphs indicating temporal transitions of the renewable energy, the output of the renewable energy power generation device, and the operating state (output) and the output frequency of the rotary power generation device, respectively. As a comparative example, FIG. 5 shows, as (e) of FIG. 5, the temporal transition of the output frequency of the rotary power generation device in a case in which the same feedback control using the control parameter to which the correction value is not added as the feedforward component is performed.

(a) of FIG. 5 shows a temporal change in solar radiation amount (solar energy) which is the renewable energy, and shows a state in which the solar radiation amount is decreased from R1 to R2 at the time t1, and the fluctuation amount thereof is ΔR. (b) of FIG. 5 shows a temporal change in the output of the renewable energy power generation device 300, and shows a state in which the output is decreased from E1 to E2 at the time t1 so as to correspond to the renewable energy shown in (a) of FIG. 5, and the fluctuation amount thereof is ΔE.

(c) of FIG. 5 shows a temporal change in load of the rotary power generation device 400. There is not a little time lag until the fluctuation in the renewable energy (see (a) of FIG. 5) or the fluctuation in the output of the renewable energy power generation device 300 (see (b) of FIG. 5) is transmitted as the load of the rotary power generation device 400. Thus, (c) of FIG. 5 shows a state in which the load of the rotary power generation device 400 is increased from L1 to L2 at time t2 behind the time t1.

(d) of FIG. 5 shows a temporal change in the output frequency of the rotary power generation device 400 in the present embodiment. (d) of FIG. 5 shows, by a broken line, the correction value which is the feedback component added to the control parameter, and shows a state in which the correction value is increased to the predetermined value at the time t1 when the fluctuation occurs in the renewable energy or the output of the renewable energy power generation device 300, and then gradually decreased by the attenuation process by the attenuation process part 670. Adding such a correction value to the control parameter as the feedback component, the output frequency of the rotary power generation device 400 has good following performance with respect to the target frequency.

In a period in which the feedback component has an effective value (until when the feedback component becomes zero by the attenuation process), a gain in feedback control (governor controller 414) may temporarily be decreased. Thus, the feedforward component added to the control parameter is emphasized. Thus, it is possible to suppress the decrease in rotation speed of the rotary power generation device more effectively.

(e) of FIG. 5 is a comparative example according to the conventional art and in this comparative example, the correction value is not added to the control parameter as the feedback component. Thus, in the comparative example, an influence by occurrence of the fluctuation in the renewable energy or the output of the renewable energy power generation device 300 appears from the time t2 behind the time t1, and in addition, a fluctuation width Δf' of the output frequency relative to the target frequency is large, and a time required to be converged to the target frequency is long. By contrast, the present embodiment shown in (d) of FIG. 5 discloses following control on the target frequency from the time t1 ahead of the time t2, the fluctuation width Δf is small, and furthermore, convergence to the target frequency is early.

Thus, in the present embodiment, the correction value is calculated based on the fluctuation in the renewable energy or the output of the renewable energy power generation device 300 and added to the control parameter as the feedforward component. Thus, it is possible to start following control on the target frequency at a timing earlier than the time t2 at which the output of the rotary power generation device 400 fluctuates, obtaining excellent response performance. That is, in feedback control as in the comparative example, following control is started after the fluctuation in the renewable energy or the output of the renewable energy power generation device 300 influences the output fluctuation of the rotary power generation device 400, whereas in the present embodiment, with feedforward control, it is possible to improve stability to the target frequency.

Moreover, the correction value, which is the feedforward component added to the control parameter, is calculated based on the fluctuation amount of the renewable energy or the output of the renewable energy power generation device 300 and the operating state of the rotary power generation device 400, decreasing the fluctuation width Δf of the output frequency relative to the target frequency and also allowing early convergence to the target frequency.

Thus, in the present embodiment, devising control contents of the output frequency relative to the target frequency, it is possible to inexpensively implement output stabilization when the renewable energy fluctuates, without changing the hardware. In particular, since output stabilization is implemented in a control aspect, the capacity which is required of the electric storage device 500 disposed in the hybrid power generation system 100 can accordingly be low. Thus, it is possible to downsize or eliminate the electric storage device 500. This is advantageous in significantly decreasing a cost for the electric storage device 500 adopting an expensive lithium ion storage battery or the like.

INDUSTRIAL APPLICABILITY

At least one embodiment of the present invention can be used for a hybrid power generation system which includes a renewable energy power generation device and a rotary power generation device connected to a common alternating-current power system, and a control method of the hybrid power generation system.

REFERENCE SIGNS LIST

100 Hybrid power generation system
200 Alternating-current power system
300 Renewable energy power generation device
320 Renewable energy detection sensor
330 Output detection sensor
400 Rotary power generation device
410 Engine
411 Flywheel
412 Rotation speed detection sensor
414 Governor controller
415 Fuel injection pump
416 Governor actuator
420 Generator
500 Electric storage device
600 Control device
610 Renewable energy acquisition part
620 Output acquisition part
630 Fluctuation determination part
640 Correction value calculation part
650 Storage part
660 Operating state detection part
670 Attenuation process part

The invention claimed is:

1. A hybrid power generation system, comprising:
a renewable energy power generation device capable of generating power by using renewable energy;
a rotary power generation device connected to an alternating-current power system in common with the renewable energy power generation device, the rotary power generation device being capable of generating power such that an output fluctuation of the renewable energy power generation device is reduced; and
a control device for controlling the rotary power generation device such that a rotation speed of the rotary power generation device reaches a target rotation speed,
wherein the hybrid power generation system comprises: a fluctuation determination part for determining whether a fluctuation amount of the renewable energy supplied to the renewable energy power generation device or an output of the renewable energy power generation device exceeds a predetermined value; and
a correction value calculation part for calculating a correction value of a control parameter based on the fluctuation amount, and
wherein the control device controls the rotary power generation device based on the control parameter which is obtained by adding, as a feedforward component, to the control parameter on a feedback control loop of the control device, the correction value calculated by the correction value calculation part, if the fluctuation determination part determines that the fluctuation amount of the renewable energy supplied to the renewable energy power generation device or the output of the renewable energy power generation device exceeds the predetermined value.

2. The hybrid power generation system according to claim 1,
wherein the control device performs feedback control on the control parameter based on a difference between the target rotation speed and an actually measured rotation speed of the rotary power generation device.

3. The hybrid power generation system according to claim 2,
wherein the control device temporarily decreases a gain when performing the feedback control on the control parameter, if the fluctuation determination part determines that the fluctuation amount of the renewable energy supplied to the renewable energy power generation device or the output of the renewable energy power generation device exceeds the predetermined value.

4. The hybrid power generation system according to claim 1, further comprising:
a storage part for storing reference data defining a relationship between the fluctuation amount and the correction value for each operating state of the rotary power generation device; and
an operating state acquisition part for acquiring the operating state of the rotary power generation device,
wherein the correction value calculation part calculates the correction value of the control parameter based on the fluctuation amount, based on the reference data corresponding to the operating state acquired by the operating state acquisition part.

5. The hybrid power generation system according to claim 1, comprising an electric storage device connected to the alternating-current power system such that the output fluctuation of the rotary power generation device is reduced.

6. The hybrid power generation system according to claim 1,
wherein the renewable energy is solar energy.

7. The hybrid power generation system according to claim 1,
wherein the renewable energy is wind energy.

8. The hybrid power generation system according to claim 1,
wherein the rotary power generation device includes an engine as a power source, and
wherein the control parameter is a drive amount of an actuator for adjusting a fuel injection amount of the engine.

9. A control method of a hybrid power generation system which includes:
a renewable energy power generation device capable of generating power by using renewable energy;
a rotary power generation device connected to an alternating-current power system in common with the renewable energy power generation device, the rotary power generation device being capable of generating power such that an output fluctuation of the renewable energy power generation device is reduced; and a control device for controlling the rotary power generation device such that a rotation speed of the rotary power generation device reaches a target rotation speed, the control method comprising:

a fluctuation determination step of determining whether a fluctuation amount of the renewable energy supplied to the renewable energy power generation device or an output of the renewable energy power generation device exceeds a predetermined value; and a control step of controlling the rotary power generation device such that the rotation speed of the rotary power generation device reaches the target rotation speed, wherein, if the fluctuation determination part determines that the fluctuation amount of the renewable energy supplied to the renewable energy power generation device or the output of the renewable energy power generation device exceeds the predetermined value, in the control step, the rotary power generation device is controlled based on a control parameter which is obtained by adding, as a feedforward component, to the control parameter on a feedback control loop of the control device, a correction value calculated based on the fluctuation amount.

* * * * *